Jan. 15, 1946.   C. E. BRICKER   2,392,970
BRAKE SHOE SPRING ARRANGEMENT
Filed July 20, 1944
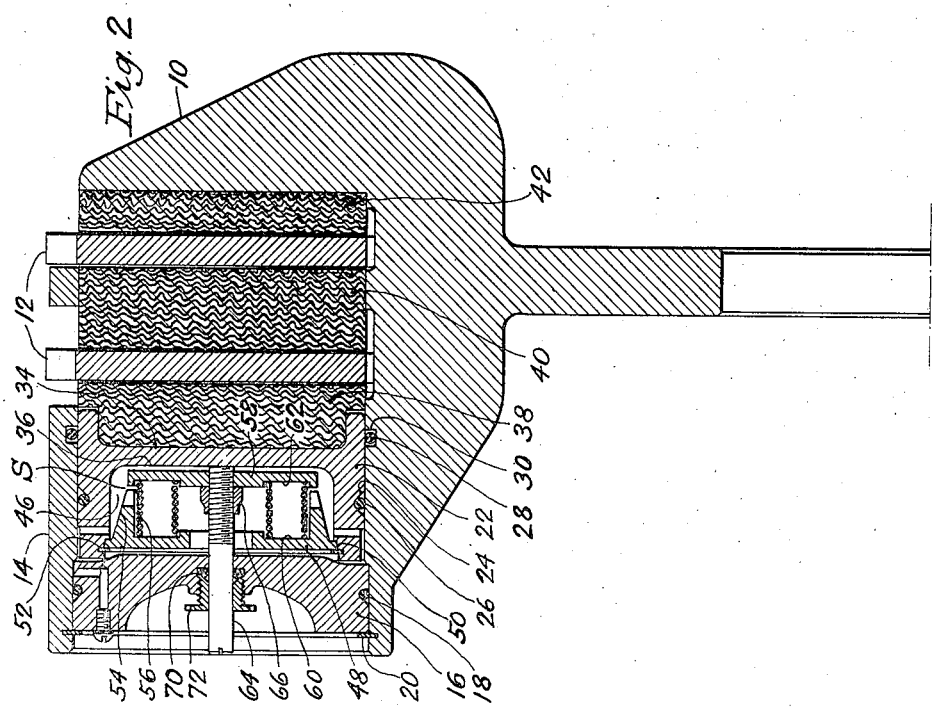
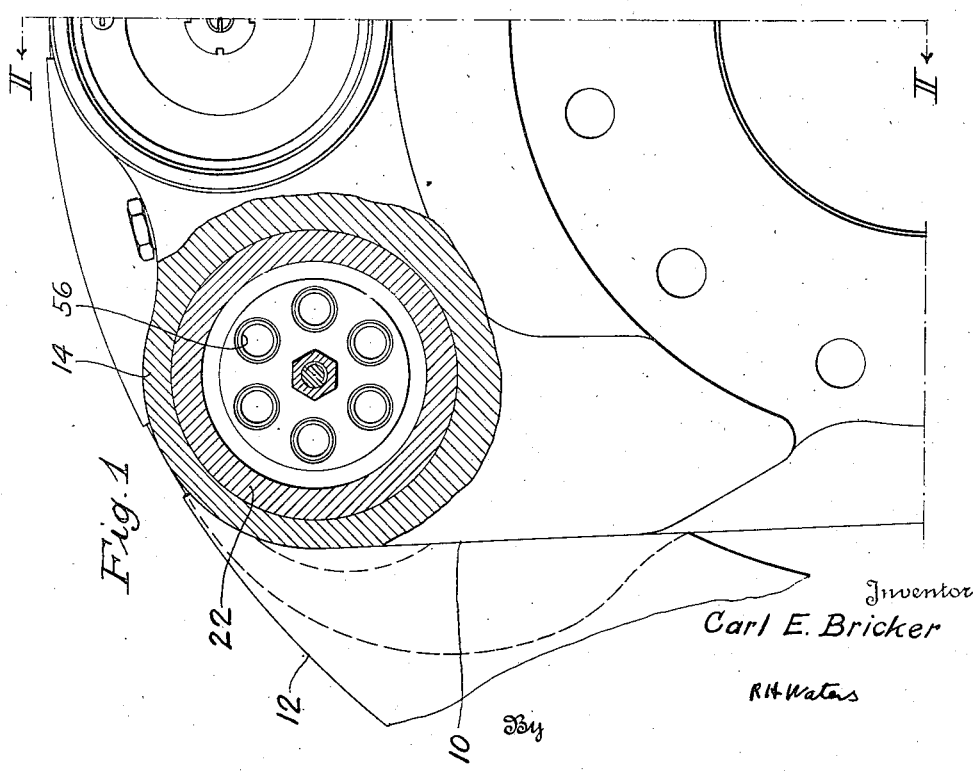
Inventor
Carl E. Bricker
By R H Waters
Attorney Patented Jan. 15, 1946

2,392,970

UNITED STATES PATENT OFFICE 2,392,970

BRAKE SHOE SPRING ARRANGEMENT

Carl E. Bricker, Akron, Ohio, assignor to Wingfoot Corporation, Akron, Ohio, a corporation of Delaware Application July 20, 1944, Serial No. 545,833

13 Claims. (Cl. 188—152)

This invention relates to a single or multiple disk brake provided with brakeshoes of the spot type, and which are energized by a fluid-pressure cylinder, and, in particular, to the spring arrangement for retracting the brakeshoes or friction elements from the brake disks.

Heretofore springs for the purpose indicated had to be designed for large deflections and for a strength sufficient to retract the brakeshoes at all stages of brakeshoe wear. For instance, when using compression springs, the springs had to be deflected so much more as the brakeshoes wore off than when they were in new condition. Because of that, the spring had to be made much larger and stronger than would be required for standard brake clearance, and a correspondingly large space for it was needed.

It is the general object of this invention to avoid and overcome the foregoing and other difficulties of and objections to prior art practices, by the provision of a retracting spring arrangement for the brakeshoes whereby the springs are subjected to constant stress at all stages of brakeshoe wear, which stress is kept at a minimum.

Another object of this invention is to keep the springs as short as possible in order to obtain a compact brakeshoe construction which can be installed within minimum space.

Another object of this invention is to so arrange the retracting springs that the total clearance between the brakeshoes and the brake disk remains constant at all stages of wear.

Another object of this invention is the provision of a resilient connection between the brakeshoe cylinder piston and its rod with their axial movement relative to each other being constant but adjustable.

Another object of this invention is to provide improved adjustable gripping means for the cylinder piston rod to permit travel of the piston rod towards the brake disk but not opposite thereto.

The aforesaid objects of the invention, and other objects which will become apparent as the description proceeds, are achieved by providing the fluid pressure-operated brakeshoe piston with a rod resiliently engaging the piston and permitting a longitudinal movement between the piston and the piston rod substantially equal to the total brakeshoe clearance. The piston rod is held in the cylinder head by a grip of adjustable power, which will resist the maximum pressure of the springs which engage the piston rod with the piston, however, the piston rod will move towards the brake disk whenever the brake is applied and the brake clearance is greater than the relative movement possible between the piston and the piston rod. After the pressure in the cylinder has been released, the brakeshoes are retracted a fixed, but adjustable, distance from the brake disks as controlled by the spacer between the piston and the piston rod. Thus, the maximum deflection of the springs arranged on a circle is constant and is limited to a minimum, with the result that the springs can be relatively short to thereby reduce the width of the brakeshoe structure.

Although the principles of the invention are applicable for any number of cylinders and brake disks, the invention will be described only in connection with the example thereof shown in the drawing.

For a better understanding of this invention, reference should now be had to the accompanying drawing, wherein Fig. 1 is a fragmentary side view of the invention, partly shown in crosssection; and Fig. 2 is a cross-section taken on line II—II of Fig. 1.

With specific reference to the drawing, the numeral 10 indicates a stationary brake jaw embracing two spaced, rotatable brake disks 12 feathered to for rotation with a wheel (not shown). The brake jaw at one side is appropriately bored to provide one or more, such as three, pressure cylinders 14, each being closed at one end by a cylinder head 16 sealed by a packing ring 18 against the cylinder and secured thereto by a spring ring 20.

Because all the cylinders 14 are similar only one will be described.

In the cylinder 14 is inserted a piston 22 provided with a groove 24 for a sealing ring 26. Another ring 28 inserted in a groove 30 of the cylinder serves as an additional seal to hold the pressure. At the disk side of the piston a friction shoe or facing 38 is inserted in a recess 34, defined in part by a wall 36, in the piston. Friction inserts 40 and 42 held in the jaw 10 for engagement with the brake disks 12 complete the frictional portion.

At the other side of the piston wall is formed a recess 46 of greater depth than the recess 34. The recess 46 is covered by a spring seat plate 48 fitting with its outer circumference 50 into the piston recess 46 and secured therein by a spring ring 52. This spring seat plate 48 is provided at its inner side with a circular extension or flange 54 which surrounds a plurality of springs 56 arranged on a circle between the plate 48 and a second spring seat 58 of disk shape. Both spring seats are provided with opposed circular recesses 60 and 62 respectively for proper spacing of the springs. Into the inner spring seat 58 is screwed a piston rod 64 which is adjustably locked in place by a nut 66. The piston rod extends slightly beyond the flat face of the spring seat 58 to form a stop for the piston when retracted by the spring.

The piston rod is made slidable in the cylinder head 16, but only in a braking direction. For example, when fluid pressure forces the piston outwardly the piston rod 64 and spring seat plate

58 do not move until the spring seat plate 48 moves to close the space S between the plates. Continued outward movement of the piston then picks up the plate 58 and the piston rod 64 and moves the piston rod in a braking direction through the cylinder head 16. In order for the piston rod to move, the clearance between the brakeshoes and disks must be greater than the space S between the two spring seats 48 and 58. For preventing the piston rod from moving in an opposite direction, it is held in the cylinder head by a packing ring 70, made of elastic material, preferably oil-resistant rubber, and pressed against the piston rod by an outside threaded gland 72 screwed into the cylinder head until a friction force greater than the total maximum pressure of the springs 56 is produced.

By this means the piston will gradually move outwardly as the brakeshoes wear off, however, after each brake application the brake clearance will always remain the same, which is highly desirable because a relatively short movement of the piston will always obtain the same braking action. It will be understood that when the fluid pressure behind the piston is released, the piston rod 64 and spring seat plate 58 remain stationary and with the springs 56 then moving the spring seat 48 and the piston back away from braking position to re-establish the clearance S between the spring seats. The brake clearance, which is determined by the space S, can be adjusted to suit requirements by screwing the piston rod 64 farther into or out of the spring seat 58 to thus change the space S.

In operating the brake it will be seen that the fluid (usually hydraulic) pressure will push the piston proper against the brake disk. When this occurs, the contact between the end of the piston rod and the piston is broken by the same space S, first by compressing the springs 56 until the space S becomes zero. If now the brakeshoes still have some clearance the piston rod will be pulled by the piston through the elastic grip 70 until a complete braking contact between the brakeshoes and the brake disks has been established. The piston rod will remain in this position until brake wear results and the piston rod is automatically moved forward again. In releasing the pressure, the piston rod remains at its new position, whereas the piston is pushed back by the spring 56 until the piston strikes the end of the piston rod, namely, the distance S, which is constant, but which can be adjusted to provide the desired brake clearance.

The structure described provides the very important function of a constant spring tension opposing the setting of the brakes regardless of the amount of brakeshoe wear. This means that the same foot pedal operating pressures or forces are required whether the brakeshoes are thick or thin.

From the foregoing description it will be apparent that all of the objects cited above are fully achieved by the embodiment of the invention described, which provides a construction of shortest width for a constant brake clearance at all stages of brake wear.

It will be understood that the invention is not limited to the example thereof shown in the drawing and herein described, but that many modifications thereof may be made within the spirit and scope of the appended claims.

I claim:

1. In combination with a disk brake having annular disks and friction members in cooperation therewith, at least one pressure fluid operated cylinder including a piston movable therein for energizing said brake, a piston rod, gripping means provided in the head of said cylinder for immovably holding said piston rod when pressure from said cylinder is removed, resilient means interposed between said piston and piston rod for retracting the piston after braking action has taken place, and spacer means limiting, when pressure is applied, the maximum deflection of said resilient means to a distance equal that of the total desired brake clearance, which is constant at all stages of brake wear.

2. In combination with a disk brake having annular disks and friction members in cooperation therewith, at least one pressure fluid operated cylinder including a piston movable therein for energizing said brake, a piston rod, adjustable and resilient gripping means provided in the head of said cylinder for immovably holding said piston rod when pressure from said cylinder is removed, resilient means interposed between said piston and piston rod for retracting the piston after braking action has taken place, and spacer means limiting, when pressure is applied, the maximum deflection of said resilient means to a distance equal that of the total desired brake clearance, which is constant at all stages of brake wear.

3. In combination with a disk brake having annular disks and friction members in cooperation therewith, at least one pressure fluid operated cylinder including a piston movable therein for energizing said brake, a piston rod, gripping means provided in the head of said cylinder for immovably holding said piston rod when pressure from said cylinder is removed, resilient means made adjustable by said piston rod and interposed between said piston and piston rod for retracting the piston after braking action has taken place, and spacer means limiting, when pressure is applied, the maximum deflection of said resilient means to a distance equal that of the total desired brake clearance, which is constant at all stages of brake wear.

4. In combination with a disk brake having annular disks and friction members in cooperation therewith, at least one pressure fluid operated cylinder including a piston movable therein for energizing said brake, a piston rod, adjustable and resilient gripping means provided in the head of said cylinder for immovably holding said piston rod when pressure from said cylinder is removed, resilient means made adjustable by said piston rod and interposed between said piston and piston rod for retracting the piston after braking action has taken place, and spacer means limiting, when pressure is applied, the maximum deflection of said resilient means to a distance equal that of the total desired brake clearance, which is constant at all stages of brake wear.

5. In combination with a disk brake having at least one annular disk and friction members in cooperation therewith, a pressure fluid operated cylinder including a piston movable therein for energizing said brake and having at its outer end one of said friction members attached thereto, a piston rod, adjustable resilient gripping means provided in the head of said cylinder for immovably holding said piston rod when the cylinder is not subjected to pressure, a spring seat within said piston and adjustably attached and secured to said piston rod, a second spring seat removably secured to the open end of said piston and having an aperture for the passage of said piston rod, springs arranged on a circle between said seats pressing the piston against the inner end of said piston rod, spacing means provided between said spring seats permitting a predetermined deflection of said springs equal to the total brake clearance when pressure is applied to said cylinder.

6. In combination with a disk brake having at least one annular disk and friction members in cooperation therewith, a pressure fluid operated cylinder including a piston movable therein for energizing said brake and having at its outer end one of said friction members attached thereto, a piston rod, adjustable resilient gripping means provided in the head of said cylinder for immovably holding said piston rod when the cylinder is not subjected to pressure, a spring seat within said piston and adjustably attached and secured to said piston rod, a second spring seat removably secured to the open end of said piston and having an aperture for the passage of said piston rod, springs arranged on a circle between said seats pressing the piston against the inner end of said piston rod, spacing means provided between and extending from one of said spring seats permitting a predetermined deflection of said springs equal to the total brake clearance when pressure is applied to said cylinder.

7. In combination with a disk brake having at least one annular disk and friction members in cooperation therewith, a pressure fluid operated cylinder including a piston movable therein for energizing said brake and having at its outer end one of said friction members attached thereto, a piston rod, an oil-resistant rubber ring provided in the head of said cylinder for immovably holding said piston rod when the cylinder is not subjected to pressure, an adjustable gland for regulating the pressure of said rubber ring against said piston rod, a spring seat within said piston and adjustably attached and secured to said piston rod, a second spring seat removably secured to the open end of said piston and having an aperture for the passage of said piston rod, springs arranged on a circle between said seats pressing the piston against the inner end of said piston rod, spacing means provided between said spring seats permitting a predetermined deflection of said springs equal to the total brake clearance when pressure is applied to said cylinder.

8. In combination with a disk brake having annular disks and friction members in cooperation therewith, at least one pressure fluid operated cylinder including a piston movable therein for energizing said brake, a piston rod, gripping means provided in the head of said cylinder for immovably holding said piston rod when pressure from said cylinder is removed, and permitting movement of the piston rod when pressure is applied to the piston and the brake clearance has become greater than it was originally, resilient means interposed between said piston and piston rod for retracting the piston after braking action has taken place, and spacer means limiting, when pressure is applied, the maximum deflection of said resilient means to a distance equal to that of the total desired brake clearance, which is constant at all stages of brake wear.

9. In combination with a disk brake having annular disks and friction members in cooperation therewith, at least one pressure fluid operated cylinder including a piston movable therein for energizing said brake, a piston rod, resilient means interposed between said piston and said piston rod permitting movement of said piston relative said piston rod a predetermined distance, and a deformable resilient gripping means provided in the head of said cylinder for immovably holding said piston rod when no pressure is applied to the cylinder and permitting movement of the piston rod when pressure is applied to the cylinder and the brake clearance has become greater than the possible relative movement between piston and piston rod.

10. In combination with a disk brake having annular disks and friction members in cooperation therewith, at least one pressure fluid operated cylinder including a piston movable therein for energizing said brake, said piston having attached to one end one of said friction members of circular shape and being provided at its other side with a cavity, a spring seat having a central aperture, being removably, but securely, attached to the end of said piston, a piston rod passing through said aperture, a second spring seat adjustably secured to one end of said piston rod, a plurality of springs arranged on a circle pressing against said seats and fitting into separate recesses thereof, and a spacer surrounding said springs permitting relative longitudinal movement of said piston and said piston rod equal to a desired constant brake clearance.

11. A brake structure including a braking surface, a braking member, a fluid pressure motor having a piston and cylinder for moving the member against the surface to effect a braking action, a spring seat element movable with the piston, a spring seat unit associated with the cylinder, a compression spring between the element and the unit, means mounting the unit on the cylinder for frictionally resisted movement with the piston, and means for adjusting the clearance between the element and the unit.

12. A brake assembly comprising a braking surface, a braking member, piston and cylinder means for effecting relative movement between the surface and the member to achieve a braking action, means for effecting relative inward movement of the piston and cylinder to effect movement apart of the surface and the member, a stop for limiting the inward movement of the piston and cylinder and thus the movement apart of the surface and the member, and means for automatically repositioning the stop to compensate for brake wear, the means for effecting relative inward movement of the piston and cylinder and the movement apart of the surface and the member being mounted in association with the stop, whereby the effective force of the means remains substantially constant regardless of brake wear.

13. A brake assembly including a piston and cylinder, a brake member operated by the piston, a rod carried by the cylinder and extending towards the piston, means frictionally holding the rod in the cylinder and resisting movement of the rod towards the piston, resilient means mounted on the rod and normally urging the piston inwardly of the cylinder to engage with the end of the rod as a stop, said resilient means yielding to allow outward movement of the piston in the cylinder before the means holding the rod in the cylinder yields, and stop means between the piston and rod so that outward movement of the piston beyond a selected clearance causes the stop means to engage, with further outward movement of the piston moving the rod to a new stop position with respect to inward movement of the piston.

CARL E. ERICKER.